United States Patent [19]

Opitz et al.

[11] Patent Number: 4,939,242
[45] Date of Patent: Jul. 3, 1990

[54] PROCESS FOR THE PREPARATION OF THE LITHIUM SALT OF A FIBER-REACTIVE AZO DYESTUFF

[75] Inventors: Konrad Opitz, Liederbach, Fed. Rep. of Germany; Marcos Segal, Suzano, Brazil

[73] Assignee: Hoechst Aktiengesellschaft, Frankfurt am Main, Fed. Rep. of Germany

[21] Appl. No.: 173,716

[22] Filed: Mar. 25, 1988

[30] Foreign Application Priority Data

Mar. 27, 1987 [DE] Fed. Rep. of Germany ....... 3710176

[51] Int. Cl.$^5$ .................... C09B 62/51; C09B 62/507; C09B 67/26
[52] U.S. Cl. ..................... 534/581; 534/582; 534/583; 534/642; 534/887
[58] Field of Search ................. 534/583, 642, 581, 582

[56] References Cited

U.S. PATENT DOCUMENTS

| | | | |
|---|---|---|---|
| 3,600,376 | 8/1971 | Franklin | 534/583 X |
| 3,635,944 | 1/1972 | Litke | 534/583 X |
| 3,655,640 | 4/1972 | Hoare | 534/583 X |
| 3,701,624 | 10/1972 | Franklin | 534/583 X |
| 4,313,872 | 2/1982 | Heinrich et al. | 534/642 X |
| 4,379,937 | 4/1983 | Corso et al. | 534/583 X |
| 4,607,096 | 8/1986 | Landler et al. | 534/642 X |
| 4,652,634 | 3/1987 | Mischke et al. | 534/642 |
| 4,707,545 | 11/1987 | Meininger et al. | 534/642 X |
| 4,760,134 | 7/1988 | Corso et al. | 534/583 X |

FOREIGN PATENT DOCUMENTS

| | | | |
|---|---|---|---|
| 0122881 | 10/1984 | European Pat. Off. | 534/583 |
| 0183142 | 6/1986 | European Pat. Off. | 534/583 |
| 0077965 | 7/1986 | European Pat. Off. | 534/583 |
| 2168535 | 8/1973 | France | 534/642 |
| 2339653 | 8/1977 | France | 534/642 |
| 1318111 | 5/1973 | United Kingdom | 534/583 |

Primary Examiner—Floyd D. Higel

[57] ABSTRACT

A process for the preparation of the lithium azo compound of the formula

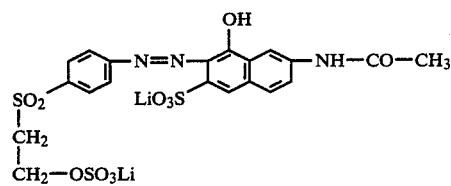

having an Na content of less than 0.2% by weight, in particular less than 0.1% by weight, in which the lithium salt of 4-(β-sulfatoethylsulfonyl)-aniline is diazotized in an aqueous solution or in an aqueous solution containing a water-miscible organic solvent by means of nitrosylsulfuric acid, and the product is coupled with the lithium salt of 1-hydroxy-7-acetylaminonaphthalene-3-sulfonic acid.

11 Claims, No Drawings

PROCESS FOR THE PREPARATION OF THE LITHIUM SALT OF A FIBER-REACTIVE AZO DYESTUFF

The invention is in the technical field of fiber-reactive azo dyestuffs.

The fiber-reactive azo dyestuff, of formula (A) which is written in the form of the free acid,

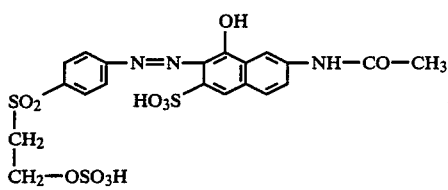

is known, as the sodium salt, from the Color Index as C.I. Reactive Orange 16 and has a solubility in water so low that its use by various dyeing processes, especially its use in padding liquors, involves considerable difficulties in achieving deep dyeings which are level and free from blotches. The reason for this is that precipitation of dyestuff from the dye liquors takes place very readily, especially as the solubility in water of the dyestuff is additionally reduced by the addition of electrolyte salts and alkali, which is customary and necessary when dyeing with reactive dyestuffs. The solubility in water of the sodium salt of this dyestuff is also not sufficient for the preparation of liquid aqueous dyeing preparations having a dyestuff content of at least 10% by weight which is of interest for industrial use.

This drawback has already been successfully eliminated by converting this dyestuff into its lithium salt (see Examples 2 and 9 of European Published Patent Application No. 0,183,142 A2). Although a pure lithium salt of the azo compound of the formula (A), which is indeed virtually free from electrolyte salts, is obtained by means of the process described therein, the process for the preparation of this lithium reactive dyestuff, even though it offers considerable advantages compared with the state of the art, still has drawbacks which have made it appear desirable to look for another route for the synthesis of this lithium reactive dyestuff. This is because the known process produces considerable manufacturing residues in the form of calcium sulfate (gypsum) and the mother liquor of the calcium salt of the dyestuff (A). The gypsum produced can be taken to a dump, unless it can be utilized in other ways; on the other hand, the mother liquor, which contains salts and dyestuffs, requires an additional working-up treatment before it can be removed as effluent.

Because the good, and improved, solubility of the lithium salts of anionic dyestuffs in water in comparison with the sodium and potassium salts was known, attempts had already been made before the discovery of the known process of European Published Patent Application No. 0,183,142 A2 to look for advantageous methods of preparing the lithium salts of dyestuffs. All of these, however, have technical disadvantages and/or cannot be made use of as an advantageous route for the preparation of a virtually sodium-free lithium salt of the azo compound(A).

Thus, for example, in U.S. Pat. No. 3,655,640 the aqueous solution obtained from the synthesis of the sodium salt of the azo dyestuff described therein is first converted, by neutralization with sulfuric acid to a pH of 6.8, into a dyestuff product which is stated to be present in the acid form of this dyestuff and which is then isolated and washed free from sulfuric acid and sodium by means of water, dried and converted into the lithium salt of this dyestuff by grinding with lithium hydroxide. However, this process has disadvantages for anionic, fiber-reactive dyestuffs containing groups imparting solubility in water, such as sulfo groups and the sulfato group in the fiber-reactive radical. If an attempt is made to convert the sodium or potassium salts of these dyestuffs by acid into the acid form of the reactive dyestuff, this cannot be achieved quantitatively; the dyestuff is precipitated—if at all—in the form of its acid sodium or potassium salt or as a mixture of the free acid with the sodium or potassium salt, and the remaining alkali metal ions can only be washed out of this complex mixture of dyestuffs with difficulty by means of aqueous acid; in the course of this it is not possible to exclude the possibility that the fiber-reactive group of the dyestuff will be damaged during the protracted treatment with acid. Furthermore, additional treatment problems arise on account of the acid effluents.

Another procedure for the preparation of lithium salts of dyestuffs, which is, however, limited to the salts of 1:2 metal complex azo dyestuffs, is described in European Patent No. 0,077,965. In this procedure, the preparation of these lithium dyestuffs is effected by carrying out the coupling reaction and the metal complex formation reaction in an organic, water-miscible solvent and adjusting the pH during the coupling reaction by means of an alkaline lithium compound; the resulting metal complex azo dyestuff remains in solution, mainly in the form of the lithium salt, whereas inorganic sodium salts, such as sodium chloride, are largely precipitated. In addition to the specificity of this process to metal complex azo dyestuffs, which a priori does not permit the application of this process to C.I. Reactive Orange 16, it has the disadvantage that it is necessary to employ water-miscible organic solvents, which can only be worked up again in an expensive manner.

In addition, U.S. Pat. Nos. 3,600,376, 3,701,624 and 3,635,944 describe the preparation of lithium salts of anionic azo dyestuffs without a fiber-reactive group; these dyestuffs are, however, not obtained as pure lithium salts, but as lithium-sodium salts, because reagents which are present in the form of sodium compounds have to be used in the synthesis. Thus, for example, the lithium nitrite required for the diazotization is not industrially accessible and it is not possible to carry out intermediate isolation steps by precipitation with lithium chloride.

Mixtures of lithium and sodium salts of anionic azo dyestuffs are also obtained by the process of British Patent No. 1,318,111, since the conversion, carried out therein, of the sodium salts of fiber-reactive dyestuffs into the lithium salts thereof in order to improve the solubility of the dyestuff is effected only by the addition of a, water-soluble lithium salt.

The processes just discussed, excepting the process of EP No. 0,183,142 A2, do not result in high-purity lithium salts of fiber-reactive dyestuffs and hence do not result in the preparation of a pure lithium salt of the azo compound of the formula (A) either. Even relatively small amounts of sodium ions in such a dyestuff prevent the liquid, aqueous, concentrated dyestuff preparations from having good stability on storage at low temperatures. Even 1 sodium ion per dyestuff molecule in a synthesis product of the Li-dyestuff salt of the dyestuff of the formula (A), which can, for example, be obtained by diazotizing the lithium salt of 4-(β-sulfatoethylsulfonyl)-aniline in a customary manner in acid solution with an equivalent amount of sodium nitrite, and coupling the product with the lithium salt of 1-hydroxy-7-acetylaminonaphthalene-3-sulfonic acid, prepared in accordance with Example 3 of U.S. Pat. No. 4,379,937, results in the precipitation from a liquid, aqueous, concentrated dyestuff preparation, after only a few days at 0° C., of the sparingly soluble sodium salt (C.I. Reactive Orange 16) from this lithium/sodium dyestuff salt mixture.

A process has now been found by means of the present invention for the preparation of the azo dyestuff in the form of the lithium salt of the formula (1)

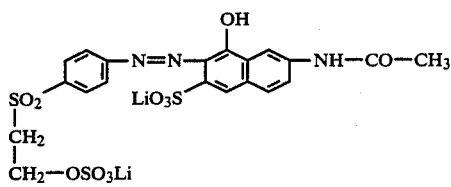

in which this lithium dyestuff is obtained in the form of the pure lithium dyestuff salt with an Na content of less than 0.2% by weight, preferably less than 0.1% by weight. The process according to the invention comprises diazotizing the lithium salt of 4-(μ-sulfatoethylsulfonyl)-aniline, preferably in aqueous solution, by means of nitrosylsulfuric acid and coupling the product with the lithium salt of 1-hydroxy-7-acetylaminonaphthalene-3-sulfonic acid, preferably in aqueous solution.

The diazotization and coupling medium is preferably an entirely aqueous solution. It is also possible, however, concomitantly to use organic, water-miscible solvents, such as, for example, lower alkanols, such as methanol and ethanol, dimethylformamide, dimethyl sulfoxide and N-methylpyrrolidone. The lithium salt of the diazo component can be obtained by neutralizing the sulfuric acid half-ester of 4-(μ-hydroxyethylsulfonyl)-aniline, which can be obtained in a customary manner by means of the baking process. The lithium salt of the coupling component is obtained, for example, by the process known from U.S. Pat. No. 4,379,937.

The diazotization reaction is carried out, as a rule, at a temperature between −5° C. and +20° C. in a solution of a strong mineral acid, such as sulfuric acid or hydrochloric acid, but preferably without the addition of an acid and using solely nitrosylsulfuric acid (this is, as a rule, present in sulfuric acid as solvent), at a pH of 2 or less than 2. The coupling reaction is carried out at a temperature between 0° and 30° C., preferably between 5° and 25° C., and at a pH between 3 and 7, preferably between 3.5 and 6.5 and especially between 4 and 6.

The process according to the invention is carried out, for example, by running in (introducing) nitrosylsulfuric acid below the surface of an aqueous solution of the lithium salt of 4-(β-sulfatoethylsulfonyl)-aniline, with cooling and stirring, at a temperature between 0° C. and −10° C. at a rate such that no nitrous gases are evolved. An aqueous solution of the lithium salt of 1-hydroxy-7-acetylaminonaphthalene-3-sulfonic acid is added to the diazonium salt suspension obtained, and the pH of the mixture is adjusted to a value between 3.5 and 6.5, preferably between 4 and 6, with lithium hydroxide or with a carbonate salt of lithium, preferably with lithium carbonate. The coupling reaction takes place rapidly in a short time.

The diazotization according to the invention of the lithium salt of 4-(β-sulfatoethylsulfonyl)-aniline together with the subsequent coupling reaction with the lithium salt of the coupling component mentioned can also be carried out with equal advantage using lithium nitrite, nitrous gases (oxides of nitrogen) or an ester of nitrous acid, such as amyl nitrite, as the diazotization reagent, in each case with the addition of a mineral acid, such as sulfuric acid or hydrochloric acid, instead of using nitrosylsulfuric acid. The use of these diazotization reagents is, however, only of slight importance from the technical point of view.

One variant of the process according to the invention, which offers advantages particularly if it is desired to have an aqueous solution of the highest possible concentration of the azo compound of the formula (1), comprises initially taking the aqueous diazonium salt suspension of the lithium salt of 4-(β-sulfatoethylsulfonyl)-aniline and adding the lithium salt of the coupling component mentioned in a concentrated form, for example as a dry powder or as a moist press cake, and adjusting and maintaining the pH at a value between 3.5 and 6.5, preferably 4 and 6, by means of an inorganic basic lithium compound, such as, preferably, lithium carbonate.

Another advantageous variant of the process according to the invention consists in adding an inorganic basic compound of lithium, such as, for example, lithium carbonate, at the same time as the gradual addition of the diazonium salt suspension to the initially taken solution of the lithium salt of the coupling component mentioned, and at such a rate that the pH is adjusted, as early as at the start of the addition of the diazonium salt, to a range from 3.5 to 6.5, preferably 4 to 6, and is maintained during the period in which the diazonium salt is added.

The solution of the compound of the formula (1) which results in each case can be dried, for example spray-dried, immediately after the synthesis or after a so-called wet-standardization, i.e. after the addition of a suitable standardizing agent, such as, for example, lithium sulfate, lithium chloride, urea or ε-caprolactam, or it can be formulated immediately after the synthesis to give a liquid dyestuff preparation which is stable on storage, for example by means of buffer substances which are capable of adjusting and maintaining the pH at a value between 3 and 6.5, preferably between 4 and 6, such as, for example, acetic acid/lithium acetate, dilithium hydrogenphosphate and lithium dihydrogenphosphate, if appropriate with phosphoric acid, tartaric acid or citric acid, and/or other auxiliaries, for example preservatives, which are advantageous and customary for liquid preparations of reactive dyestuffs.

As is known for the compound (1), the product obtainable in accordance with the invention, whether in the form of a solid substance or of a liquid preparation, is also used for advantageously dyeing and printing material containing carboxamide and/or hydroxy groups, preferably fiber material, such as, for example, wool, silk, synthetic polyamide fibers and natural and regenerated cellulose.

Neither manufacturing residues, such as calcium sulfate, nor mother liquors, which would have to be worked up before being passed into the effluent, are produced in the process according to the invention, and the intermediate isolation and synthesis of other products, such as the calcium salt of the dyestuff, are not necessary. The process according to the invention can therefore be carried out in an extremely easy and technically simple manner, which results in considerable savings in operating time, process stages and equipment and hence in a considerable saving in cost. The lithium salt of the formula (1) is obtained by the process according to the invention in a state of very high purity and, in particular, with an Na content of less than 0.2% by weight, in particular less than 0.1% by weight, relative to the compound of the formula (1). Admittedly the lithium compound of the formula (1) prepared in accordance with the invention additionally contains lithium sulfate in comparison with the Li compound (1) obtainable by the process of EP 0,183,142 A2. In contrast with sodium sulfate or other alkali metal electrolyte salts which are as a rule, produced in the synthesis of fiber-reactive azo dyestuff together with the azo compound synthesized, the lithium sulfate in the product obtained in accordance with the invention surprisingly does not adversely affect the solubility of the compound (1) in an aqueous medium or its use in dyeing.

Even a high content of lithium sulfate, of about 25% by weight, relative to the compound (1), permits the preparation, with the compound (1), of highly concentrated aqueous solutions in which the concentration is over five times as high as is possible in the case of the corresponding sodium salt, i.e. C.I. Reactive Orange 16. When the compound (1) is used, even with a high content of lithium sulfate, no flocculation of dyestuff takes place in the dyebaths, such as, for example, the highly concentrated alkaline dye liquors which are used for single-phase dyeing or printing processes. This effect is surprising, especially since the presence of lithium sulfate in the lithium compound of the formula (1) obtainable in accordance with the invention is not undesirable from a technical point of view; since, as a rule, dyestuff powders are used in industry not as pure, 100% strength compounds, but diluted, together with electrolyte salts acting as standardizing agents, so that they can be handled more easily.

The Examples below serve to illustrate the invention. The parts are parts by weight and the percentages are percentages by weight, unless a note to the contrary is made. The ratio of parts by weight to parts by volume is that of kilograms to liters.

EXAMPLE 1

281 parts of the acid sulfuric acid half-ester of 4-($\beta$-hydroxyethylsulfonyl)-aniline are stirred into 800 parts of water and are dissolved by means of 40 parts of lithium carbonate at a pH between 5 and 5.5. The mixture is cooled to 5° C. by adding 300 parts of ice. Diazotization is carried out by introducing 318 parts of a 40% strength solution of nitrosylsulfuric acid in sulfuric acid below the surface of the mixture in the course of four hours, the reaction temperature being kept at 5° C. by the addition of about a further 500 parts of ice. Stirring is continued for one hour and the excess of nitrosylsulfuric acid is destroyed with sulfamic acid. 287 parts of the lithium salt of 1-hydroxy-7-acetylaminonaphthalene-3-sulfonic acid are then added slowly and while the pH is kept at a value of 5 by means of 207 parts of lithium carbonate, and the coupling mixture is then stirred for about a further 15 minutes.

The resulting solution of the azo compound of the formula (1) can be utilized without further treatment for dyeing or can be used as a commercial liquid dyestuff preparation, advantageously after the addition of a buffer mixture. In order to prepare a commercial liquid preparation, for ex., 67 parts of acetic acid and 37 parts of lithium carbonate and also 480 parts cf water are added to the 2,600 parts of the synthesis solution obtained, which contains 22.5% of the compound (1); this gives 3,130 parts of a liquid preparation which contains 18.6% of the compound (1) and has a pH of 4.8. This liquid preparation is stable on storage both at low temperatures, for example for more than two weeks at 0° C., and at higher temperatures, such as for two months at 40° C., i.e. no precipitation of dyestuff takes place and the depth of color and color shade of dyeings and prints produced therewith remain unchanged.

3 parts of this pH-stabilized solution can be used to prepare, in a known and customary manner, dyebaths, padding liquors and printing pastes which, when applied and fixed on cotton in the manner customary for fiber-reactive dyestuffs, produce orange dyeings and prints which have exactly the same depth of color as those which are produced by the corresponding use of equally concentrated dyebaths, padding liquors or printing pastes containing 1 part of a powder formulation containing 59.1% of C.I. Reactive Orange 16 (i.e. the sodium salt of the compound (A)).

EXAMPLE 2

A solution of 287 parts of the lithium salt of 1-hydroxy-7-acetylaminonaphthalene-3-sulfonic acid in 1,000 parts of water is cooled to 5° to 10° C. (in the course of this some of the lithium salt can crystallize out), and the diazonium salt suspension according to Example 1, containing the diazonium salt from 281 parts of 4-($\beta$-sulfatoethylsulfonyl)-aniline, is added in the manner indicated in Example 1, the pH here too being adjusted to and kept at a value of 5 to 6 by means of lithium carbonate, and the coupling reaction being carried out at 10° C. with the addition of ice. The resulting solution containing the compound (1) can be evaporated, for example spray-dried. 900 parts of a powder containing 62.5% of the compound (1) as well as lithium sulfate are obtained.

This dyestuff powder can be used to prepare padding liquors adjusted to be slightly acid or neutral as well as alkaline, and containing, for example, 50 parts of the compound (1) in 1,000 parts of padding liquor. Even the padding liquors which have been adjusted to be alkaline do not, either immediately or during the dyeing process, exhibit deposition of dyestuff, as is the case with C.I. Reactive Orange 16, the sodium salt of the compound (A).

EXAMPLE 3

A suspension of 287 parts of the lithium salt of 1-hydroxy-7-acetylaminonaphthalene-3-sulfonic acid in 1,000 parts of water is dissolved by means of 3 parts of lithium hydroxide semihydrate. The solution is cooled to 10° C., in the course of which some of the lithium salt can crystallize out again. A diazonium salt suspension according to Example 1 containing the diazonium salt from 281 parts of 4-($\beta$-sulfatoethylsulfonyl)-aniline is added, and the pH is kept from the start at a value of 4 to 6 by means of lithium carbonate, and the temperature is kept at 10° C. by means of ice. The coupling reaction is virtually complete immediately after the addition of the diazonium salt suspension and the lithium carbonate has been completed.

The aqueous solution of the compound (1) is converted, by adding a solution of 30 parts of lithium dihydrogenphosphate and 30 parts of dilithium hydrogenphosphate in 300 parts of water (obtainable by reacting 30 parts of lithium carbonate with 50 parts of phosphoric acid in water) and a further 400 parts of water, into 4,000 parts of a liquid preparation containing 14% of the compound (1) and having a pH of 4.6. This preparation is stable on storage for at least two weeks at a temperature of 0° C., for at least 12 months at a temperature of 20° C. and for at least 3 months at a temperature of 40° C., whereas a corresponding liquid preparation of the same dyestuff concentration, prepared using sodium nitrite as the diazotization agent, deposits appreciable amounts of the dyestuff C.I. Reactive Orange 16 after only 1 to 3 days at 20° C.

4 parts of the pH-stabilized solution of the compound (1) can be used to prepare, in a known and customary manner, dyebaths, padding liquors or printing pastes which, when applied and fixed to cotton in the manner customary for fiber-reactive dyestuffs, produce orange dyeings and prints which have exactly the same depth of color as those produced when using, in a corresponding manner, dyebaths, padding liquors or printing pastes of the same concentration, containing 1 part of a powder formulation containing 59.1% of C.I. Reactive Orange 16.

We claim:

1. A process for the preparation of the lithium azo compound of the formula (1)

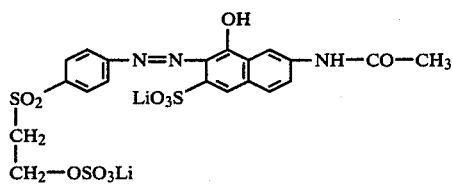

with an Na content of less than 0.2% by weight, which comprises diazotizing the lithium salt of 4-(β-sulfatoethylsulfonyl)-aniline in an aqueous solution or in an aqueous solution containing a water-miscible organic solvent by means of nitrosylsulfuric acid, and coupling the product with the lithium salt of 1-hydroxy-7-acetylaminonaphthalene-3-sulfonic acid.

2. The process as claimed in claim 1, wherein the aqueous solution of said compound is thereafter evaporated by spray-drying.

3. A process for the preparation of a pH-stabilized, liquid, aqueous dyestuff composition in which the dyestuff consists essentially of the lithium azo compound of formula (1)

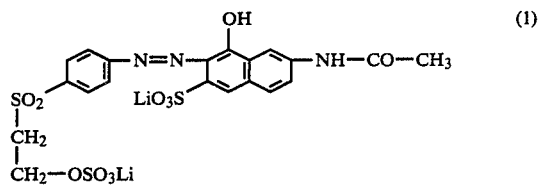

the composition having an Na content of less than 0.2% by weight, based on the lithium azo compound of formula (1), which process comprises:
 (a) diazotizing the lithium salt of 4-(β-sulfatoethylsulfonyl)-aniline in a mineral acidic aqueous solution or in a mineral acidic aqueous solution containing a water-miscible organic solvent by means of a derivative of nitrous acid as the diazotizing agent,
 (b) coupling the thus-diazotized lithium salt of 4-(β-sulfatoethylsulfonyl)-aniline in said solution with the lithium salt of 1-hydroxy-6-acetylamino-naphthalene-3-sulfonic acid.

4. A process according to claim 3 which further comprises adding to said solution, during or after step (b), a buffering substance for adjusting and maintaining the pH of said composition at a value between 3 and 6.5.

5. The process according to claim 3, wherein the diazotizing agent is nitrosyl sulfonic acid.

6. The process according to claim 4, wherein the buffering substance is added during the coupling step.

7. The process according to claim 4, wherein the buffering substance is added subsequent to the coupling step.

8. The process according to claim 4, wherein said buffering substance comprises a lithium compound.

9. The process according to claim 8, wherein said lithium compound is lithium salt, said lithium salt being lithium acetate or a phosphate or carbonate of lithium.

10. The process according to claim 9, wherein the lithium salt is included in the buffering substance in combination with acetic, phosphoric, or tartaric acid or a said acid in combination with an auxiliary or preservative.

11. A process according to claim 3, wherein the Na content of said solution is less than 0.1% by weight.

* * * * *